May 15, 1956 C. BOLTON 2,745,906

TELEPHONE SUPPORTS

Filed July 13, 1953

INVENTOR.
Cleon Bolton
BY Edward Healy
ATTORNEY

1

2,745,906

TELEPHONE SUPPORTS

Cleon Bolton, San Francisco, Calif.

Application July 13, 1953, Serial No. 367,546

1 Claim. (Cl. 179—157)

Figures 1, 2, 3, 4:
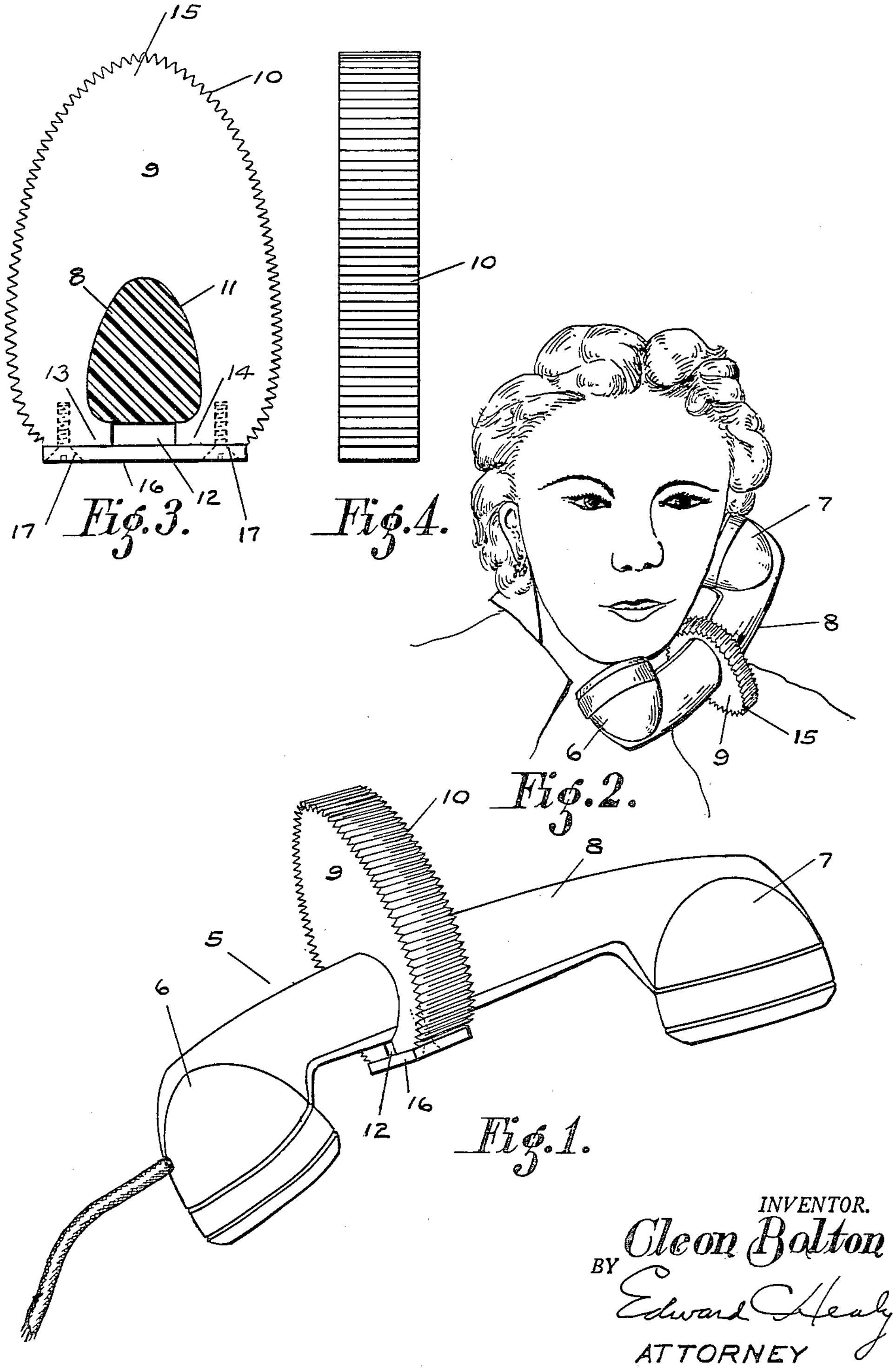

This invention relates to an improved telephone support and has particular reference to a means for supporting on the shoulder of the user the well known portable hand set that embodies a transmitter and receiver.

The principal object of the invention is the production of a single unit in the form of an inverted heart-shaped rubber member adapted to encompass the handle portion of the combined transmitter and receiver, to thus provide a medium by which the telephone instrument can be readily and comfortably retained between one shoulder and an ear of the user for the desired voice transmitting and voice receiving purposes.

A further object of the invention is to provide clamping means associated with the support, whereby the support can be effectively secured to the handle portion of the set without danger of the support being accidentally displaced from the set.

An additional object of the invention is to serrate the outer periphery of the rubber support to assure a positive retention of the device on the shoulder of the user.

A further object of the invention is the provision of a support of the character described, that is simple in construction, economical to manufacture, strong, durable and convenient and comfortable in use, and whereby in the employment of the same the hands of the user are free for making notations and attending to extraneous duties while the party is engaged in a two-way telephone conversation.

Other objects and advantages will be apparent during the course of the following description.

In the accompanying drawing, forming a part of this specification and in which like numerals are employed to designate like parts throughout the same, Fig. 1 is a perspective view of a telephone set showing my improved support secured thereto.

Fig. 2 is a perspective view of the invention shown as encompassing the handle of the telephone set and disclosing the position of the support relative to a shoulder and an ear of the user of the set, Fig. 3 is a front elevational view of the support disclosing the same as secured to the handle of the telephone set, and likewise illustrating to advantage a strip or clamp employed for retaining the support on the telephone set handle, and Fig. 4 is a side elevational view of the support per se.

In the accompanying drawing wherein for the purpose of illustration is shown an approved embodiment of my invention, the numeral 5 designates, as a whole, a portable telephone set that is equipped with the usual transmitter 6 and receiver 7 that are connected by the conventional handle portion 8. The support of the present invention comprises a moulded rubber body 9 of an inverted heart-shaped configuration that is ser-

2 rated around its outer periphery. Adjacent to the bottom of the bottom of the body 9 there is provided an opening 11 that conforms in shape to the configuration of and receives therein the medial portion of the handle 8.

By virtue of the formed opening the bottom of the rubber body is bifurcated or split to thus provide a passage-way 12 between the spaced opposite jaws 13 and 14. Due to the elasticity of the rubber body, the jaws are capable of lateral expansion, to allow for the ready adjustment of the jaws over the handle portion 8. Thus there is provided a snug fitting of the support on said handle portion. It will be noted that the upper portion of the support extends radially from the handle portion, or in other words, is positioned at substantially right angles thereto.

In Fig. 2 I have illustrated the telephone set as being used, and it will be noted that the serrated apex 15 of the support rests on the shoulder of the user. Pressure of the support on the shoulder will cause close contact of the receiver with the ear of the user and in this position the serrated apex acts as a gripping medium on the clothes. The transmitter is in proximity to the mouth of the user and accordingly the message can be readily and accurately delivered and received because of the snug engagement of the receiver with the ear and the position of the transmitter relative to the mouth of the user.

I have also found it advantageous to provide an additional means for securing the support to the set to thus prevent loss, dislodgment and unlawful removal of the support. The said means comprises a metal cross strap or clamp 16 that is suitably secured as at 17 to the bottom surface of the jaws.

From the foregoing description considered in connection with the accompanying drawing, it will be obvious that I have devised a most unique support whereby the objects of the invention can be readily accomplished.

It is understood that the form of my invention herewith shown and described is to be taken as a preferred example of the same and that changes relative to the shape, size, material and arrangement of parts may be readily resorted to without departing from the support of the invention and the scope of the subjoined claims.

Having thus described my invention, I claim:

A combination receiver-transmitter telephone unit comprising a telephone receiver, a telephone transmitter, a shank connecting said receiver and said transmitter and a shoulder-rest adapted to encompass said shank and extending radially with respect to the axis of said shank, said rest comprising a heat-shaped molded rubber body terminating in a flat bottom portion bifurcated to provide a pair of pliable jaws, spaced one from the other, to provide a passageway therebetween and in communication with an opening in said body and in which the shank is received, the entire periphery of the body, with the exception of the flat bottom, being serrated, and additional means for securing said body to the shank, said means including a metal strap straddling the passage-way and fastened at its extremities of the bottom surfaces of said jaws.

References Cited in the file of this patent

UNITED STATES PATENTS

| | | |
|---|---|---|
| D. 150,664 | Webb | Aug. 17, 1948 |
| 2,476,221 | Renneker | July 12, 1949 |
| 2,552,906 | Paul | May 15, 1951 |